(12) United States Patent
Dentler

(10) Patent No.: US 7,513,733 B2
(45) Date of Patent: Apr. 7, 2009

(54) TORQUE GENERATOR

(76) Inventor: Eugen Dentler, Amselweg 11, 88422 Oggelshausen (DE)

( * ) Notice: Subject to any disclaimer, the term of this patent is extended or adjusted under 35 U.S.C. 154(b) by 456 days.

(21) Appl. No.: 11/475,660

(22) Filed: Jun. 27, 2006

(65) Prior Publication Data

US 2006/0288698 A1    Dec. 28, 2006

(30) Foreign Application Priority Data

Jun. 27, 2005   (EP)   ................................. 05013787

(51) Int. Cl.
*F03B 17/02* (2006.01)
(52) U.S. Cl. .............................................. 415/5; 415/7
(58) Field of Classification Search .................. 415/5, 415/7; 290/44, 55
See application file for complete search history.

(56) References Cited

U.S. PATENT DOCUMENTS

| 1,708,807 | A |   | 4/1929  | Tatay     |        |
|-----------|---|---|---------|-----------|--------|
| 2,037,973 | A | * | 4/1936  | Grondahl  | 60/496 |
| 3,806,733 | A | * | 4/1974  | Haanen    | 290/55 |
| 4,363,212 | A | * | 12/1982 | Everett   | 415/5  |
| 4,718,232 | A | * | 1/1988  | Willmouth | 60/495 |
| 4,742,242 | A | * | 5/1988  | De Shon   | 415/5  |

FOREIGN PATENT DOCUMENTS

| BE | 387 150   | 3/1932  |
|----|-----------|---------|
| DE | 26 06 160 | 8/1977  |
| DE | 35 44 043 | 10/1986 |
| DE | 38 02 023 | 9/1988  |
| FR | 35 665    | 3/1930  |
| JP | 31 21 274 | 5/1991  |

OTHER PUBLICATIONS

European Search Report (with translation).
Ord-Hume, A., "Perpetual Motion-History of an obsession", St. Martin's Press, New York, USA, 1977 (pp. 99, 107-108).
Ord-Hume, A., "Perpetual Motion-History of an obsession", St. Martin's Press, New York, USA, 1977, pp. 100-103.

* cited by examiner

*Primary Examiner*—Igor Kershteyn
(74) *Attorney, Agent, or Firm*—Collard & Roe, P.C.

(57) ABSTRACT

The invention relates to a generator for obtaining energy, in particular a torque comprising at least two elastic buoyant bodies which are moved around at least two deflection elements, and in the process pass a liquid-filled container through an inlet opening, which is arranged on the end surface of the container facing the ground, the cross section of which inlet opening is smaller than the cross section of an elastic buoyant body in the unloaded state. In order to narrow the elastic buoyant bodies to the cross section of the inlet opening before they enter the liquid-filled container, a funnel element is proposed according to the invention, and is arranged in front of the inlet opening.

7 Claims, 2 Drawing Sheets

TORQUE GENERATOR

CROSS-REFERENCES TO RELATED APPLICATIONS

This application claims convention priority from European patent application EP 05 013 787.6 filed on Jun. 27, 2005.

BACKGROUND OF THE INVENTION

1. Field of Invention

The invention relates to an apparatus for generation of energy, in particular of a torque by the use of the buoyancy forces and earth's attraction forces which act on a body.

2. Description of the Art

Various energy generators are known from the prior art which convert the buoyancy force of a body which is immersed in a liquid (also referred to as the Archimedes force) and the earth's attraction force acting on the body to a torque.

For example, U.S. Pat. No. 1,708,807 B discloses an apparatus which comprises two revolving elements whose axes are arranged parallel and at right angles, aligned with respect to one another, on a base frame. A coupling element which is in the form of an endless chain is stretched between the revolving elements, an upper and a lower revolving element, and comprises a first subsection which moves against the force of gravity (tension side), and a second subsection, which moves with the force of gravity. At least two buoyant bodies are attached in series to this coupling element. The coupling element is arranged such that it can carry out a revolving movement around the upper and lower revolving element. A liquid-filled container is arranged on the first subarea of the coupling element in such a manner that the buoyant bodies can pass through the liquid-filled container. The liquid-filled container is in this case open at its upper end and, on its lower end face, has a sealing element (for example a rubber membrane) which is intended to prevent liquid from emerging from the liquid-filled container, and at the same time allows the coupling element to enter the liquid-filled container from underneath with the buoyant bodies, and to pass through it. The tension side of the coupling element passes through the liquid-filled container, as a result of which the buoyant bodies are lifted, while the buoyant bodies on the other side, which is not subject to a tension load, fall by virtue of their own weight. This results in a rotary movement around the revolving wheels.

JP 03121274 A discloses an apparatus which likewise comprises an endlessly rotating element (preferably a closed chain), to which buoyant bodies are fitted. The buoyant bodies on the tension side in this case enter the liquid-filled container from underneath via a pressure-reducing chamber and a check valve.

The publication by ORD-HUME, A.: Perpetual Motion—History of an obsession", St. Martin's Press 1977, New York, USA pages 100 to 103, FIG. 58 discloses an apparatus for energy production in the form of a torque, which comprises at least two deflection elements, which are arranged aligned with respect to one another, and an endless, chain-like coupling element, on which at least two buoyant bodies are arranged, and a vertically aligned, liquid-filled container with an inlet opening which is formed on its end face facing the ground, as well as a sealing element which prevents the liquid from emerging, with the buoyant bodies describing a revolving movement about the deflection elements and the buoyant bodies, which move against the force of gravity, passing the liquid-filled container through the inlet opening, with the buoyant bodies being elastic.

A seal is required in order to prevent leakage from the liquid-filled container. Since the buoyant bodies according to the prior art are, however, inserted through the lower end surface, facing the ground, of the liquid-filled container, that is to say through the seal, the seal must be flexible. The water pressure in the liquid-filled container loads a flexible seal such as this, for example in the form of a sealing lip composed of rubber. The larger the area of this seal, the greater is the water pressure that loads it. A buoyant body which enters the filled container from underneath must in consequence overcome the water pressure acting on the seal and, in addition, the resistance created by the stiffness of the respective material of the seal. A considerable proportion of the energy which is created by the buoyancy force which acts on the buoyant bodies that are located in the filled container is required for this purpose.

SUMMARY OF THE INVENTION

The invention is based on the object of preventing the described disadvantage of the prior art.

One object element of the invention is to provide a further apparatus of the type described initially which, in particular, uses buoyancy forces for energy production, in particular of a torque.

One of the fundamental idea of the solution is to propose buoyant bodies for an energy generator as known from the prior art, which are elastic, and thus have a flexible shape. According to the invention, the cross section of the opening which is provided for the entry of the buoyant bodies on the lower face of the liquid-filled container is smaller than the cross section of an elastic buoyant body in the unloaded state. On entry into the liquid-filled container, the cross section of a buoyant body is reduced, in order to allow it to pass through the inlet opening. As soon as the buoyant body has passed through the inlet opening, it resumes its unloaded initial shape, so that the maximum buoyancy force can act on the buoyant body within the fluid-filled container. A further reduction in the energy which is required when the elastic buoyant bodies enter the liquid-filled container is achieved by the buoyant bodies being fluid-filled, with their fluids being connected to one another. This means that, while the buoyant body is being moved through the inlet opening into the liquid-filled container, the fluid which is located in the buoyant body is at least partially emitted to the immediately adjacent buoyant body owing to the pressure acting during the deformation of the buoyant body. This results in a reduction in the resistance acting against the buoyant body as it enters the liquid-filled container. At the same time, inter alia, the receiving buoyant body, which is already located inside the container at this time, has its volume increased, thus ensuring additional lift. As soon as a buoyant body has passed through the inlet opening completely and is located in the liquid-filled container, the liquid which was emitted while it was entering the container is forced back into the original buoyant body, as a result of the fact that this is a closed system, closed in terms of fluid, since the fluids in the individual buoyant bodies are connected to one another, in which case, when this buoyant body is in the unloaded state, its volume is the same as that before it entered the liquid-filled container.

One major advantage of the invention is that the water pressure which acts on the surface of the sealing element and the water pressure which acts on the surface of the buoyant body that is entering the liquid-filled container are reduced.

Less resistance therefore need be overcome for a buoyant body to enter the liquid-filled container, with less energy being required for this purpose.

The reduction in the cross section of the inlet opening of the liquid-filled container advantageously allows the use of a smaller seal. The smaller inlet opening also reduces the possibility of leakage from the liquid-filled container.

Finally, the elasticity of the buoyant bodies which revolve around the deflection elements reduces the slip between the buoyant bodies and the deflection elements. This results in greater traction between the buoyant bodies and the deflection element, and thus in the capability to use the torque that is produced in this case more effectively.

One particularly preferred, advantageous embodiment provides an additional funnel element. This is arranged in front of the inlet opening, which is located in the lower face of the liquid-filled container. The funnel element is preferably designed in such a way that pressure is exerted mechanically on the elastic buoyant bodies as they pass through the funnel element, thus successively reducing the cross section of the buoyant bodies to the cross section of the inlet opening. The described funnel element is preferably in the form of a hollow truncated cone, whose narrow opening is preferably connected in an interlocking manner, force-fitting manner or by an integral material joint to the inlet opening of the liquid-filled container. The cross section of this funnel element may, for example, but not necessarily, be round, square, rectangular or elliptical.

Alternatively, the funnel element and the lower end face of the liquid-filled container may be integral, and may form the closure of the liquid-filled container with an inlet opening.

In one preferred embodiment, sliding elements are mounted in a funnel element such as this transversely with respect to the movement direction of the buoyant bodies, and reduce the friction between the funnel walls and the buoyant bodies passing through. Sliding elements such as these may, for example, be in the form of a plurality of rollers which are mounted independently from one another and are preferably arranged in a cross-sectional step, which tapers towards the tension direction. In addition to rollers, however, other configurations may also be chosen as the sliding elements which contribute to reducing the friction between a buoyant body and the funnel element (for example sliding surfaces, lubrication, etc.).

In a further advantageous embodiment of the invention, the buoyant bodies of the apparatus according to the invention are at such a short distance from one another that the inlet opening into the liquid-filled container is always filled, or is filled for the majority of the time, by a piece of a buoyant body. This reduces the emergence of liquid. Sealing elements are preferably additionally fitted to the edges of the inlet opening, and also prevent the emergence of liquid.

The buoyant bodies are preferably in the form of hollow bodies, whose outer skin is composed of an elastic material (for example rubber, plastic or the like). These hollow bodies can be filled with a fluid.

The buoyant bodies are either in the form of hollow bodies which are produced using injection-molding, or are composed of an electroplated material. The hollow bodies may, for example, comprise two halves which are joined together in the form of barrels on their center axis. Alternatively, the hollow body may be produced integrally from rubber using the injection-molding process, for example the cold-channel process, followed by vulcanization. An opening is provided in the area of the center axis, in which connecting elements can be introduced. These connecting elements are used to transmit the tensile forces that occur directly through the coupling element, without the tensile forces acting on the outer skin of the buoyant body. This advantageously avoids the material of the buoyant body having to be designed such that it must absorb the tensile forces, which are in fact very high.

The connecting element itself is preferably a turned part composed of aluminum or stainless steel, which comprises two halves, in which case the two halves can be arranged with respect to one another such that one is arranged within the buoyant body and the other outside it. The outer skin of the buoyant body is clamped in between the two halves of the connecting element by screwing them together, so that the cavity in the buoyant body is fluid-tight. The coupling element itself in each case produces a connection between the ends of the buoyant bodies and their connecting elements, thus creating an endless chain.

An alternative embodiment of the coupling element is for the connecting element to have continuous holes through it, and for the coupling element thus to be able to pass completely through the buoyant bodies, with the coupling element in each case being fixed to the connecting elements, for power transmission reasons.

Owing to the large tensile forces that occur, the coupling element is designed such that it is preferably in the form of a wire cable, which is advantageously plastic-sheathed, in order in this way to prevent damage to the buoyant bodies. As an alternative to this, it is also possible to provide a cable which can absorb corresponding tensile forces.

The connecting elements themselves may alternatively be formed from plastic. This is dependent on them being able to absorb the corresponding tensile forces.

One preferred form of the buoyant bodies provides for the fluid connection of the buoyant bodies to one another to be provided via the connecting element. For this purpose, the connecting element has a hole, through which the fluids in the interior of the buoyant body are connected. That connection to the subsequent or next buoyant body is achieved by means of a flexible tube connection, via a further connecting element and the hole that is provided in it. As an alternative, one advantageous variant provides a flexible tube as the coupling element, for example a flexible hydraulic tube, which is passed through the respective buoyant body and has holes transversely with respect to its longitudinal extent in the interior of each buoyant body, via which the fluid can be transported into and out of the buoyant body or bodies.

A further exemplary embodiment also provides for a single connecting element to be provided, which also surrounds one and the subsequent buoyant body. This results in efficient power transmission. In consequence, the flexibility of the buoyant bodies is still sufficient to guide them over the deflection elements.

Alternatively, the elastic buoyant bodies may be composed completely of an elastic material (for example a hydrophobic foam) without having to have a fluid-filled cavity, which elastic material allows the cross section to narrow, or may be completely or partially filled with a material such as this.

The buoyant bodies themselves are flat at their ends in one exemplary embodiment, so that they have a cylindrical shape.

When a connecting element is present, space is required between the individual buoyant bodies, in order to arrange them in an appropriate form. Provision is advantageously made for this purpose for a cavity to be created between the buoyant bodies, within which the connecting element can be arranged. However, the free ends are arranged directly with the shortest possible distance from one buoyant body to another buoyant body, thus intrinsically creating a closed chain.

The intermediate space which is required for lifting is, however, retained by the fact that sufficient fluid enters the said intermediate space because of the existing pressure.

One alternative embodiment of the apparatus according to the invention provides a single elastic buoyant body, whose cross section in the unloaded state is larger than the cross section of the inlet opening of the liquid-filled container. This is preferably designed cleverly.

The height of the liquid-filled container depends on how much lift is required, that is to say how many buoyant bodies must produce lift at the same time in the liquid-filled container in order to keep the apparatus moving against all of the friction forces which act in the apparatus.

In order to prevent leakage from the apparatus, a catchment element (for example in the form of a trough or a sheath) is preferably provided underneath the inlet opening of the liquid-filled container in order to catch the emerging fluid. The fluid that is caught can then be passed back to the liquid-filled container via a further mechanism (for example a pump).

One advantageous embodiment of the invention provides an apparatus which allows the revolving coupling element to be stressed. This may be achieved, for example, by means of adjustable deflection elements or by a separate stressing mechanism (for example a chain tensioner).

In a further alternative embodiment of the invention, a plurality of apparatuses according to the invention are detachably coupled to form a combined overall apparatus. The apparatuses can optionally be coupled by their lower and/or upper deflection elements on a common shaft, and can in this way be connected axially to one another. The torque which is produced jointly by the connected apparatus can be transmitted via the common shaft. The individual apparatuses are preferably connected to the common shaft in such a way that this connection can be released separately for each apparatus in order, for example, to allow maintenance of one apparatus while the combined overall apparatuses continue to operate.

The overall apparatus can expediently be held by a supporting frame. One alternative use of the apparatus in this case provides for the frame to be immersed with the entire apparatus in a liquid.

The overall apparatus is preferably composed of standardized parts, thus making it possible to keep the production costs low. The apparatus according to the invention can also be configured and supplied as a kit, thus saving assembly costs.

BRIEF DESCRIPTIONS OF THE DRAWING

The present invention will become more fully understood from the detailed description given herein below and the accompanying drawings which are given by the way of illustration only, and thus are not limitative of the present invention and wherein.

DESCRIPTION OF THE PREFERRED EMBODIMENT

Figure 1:
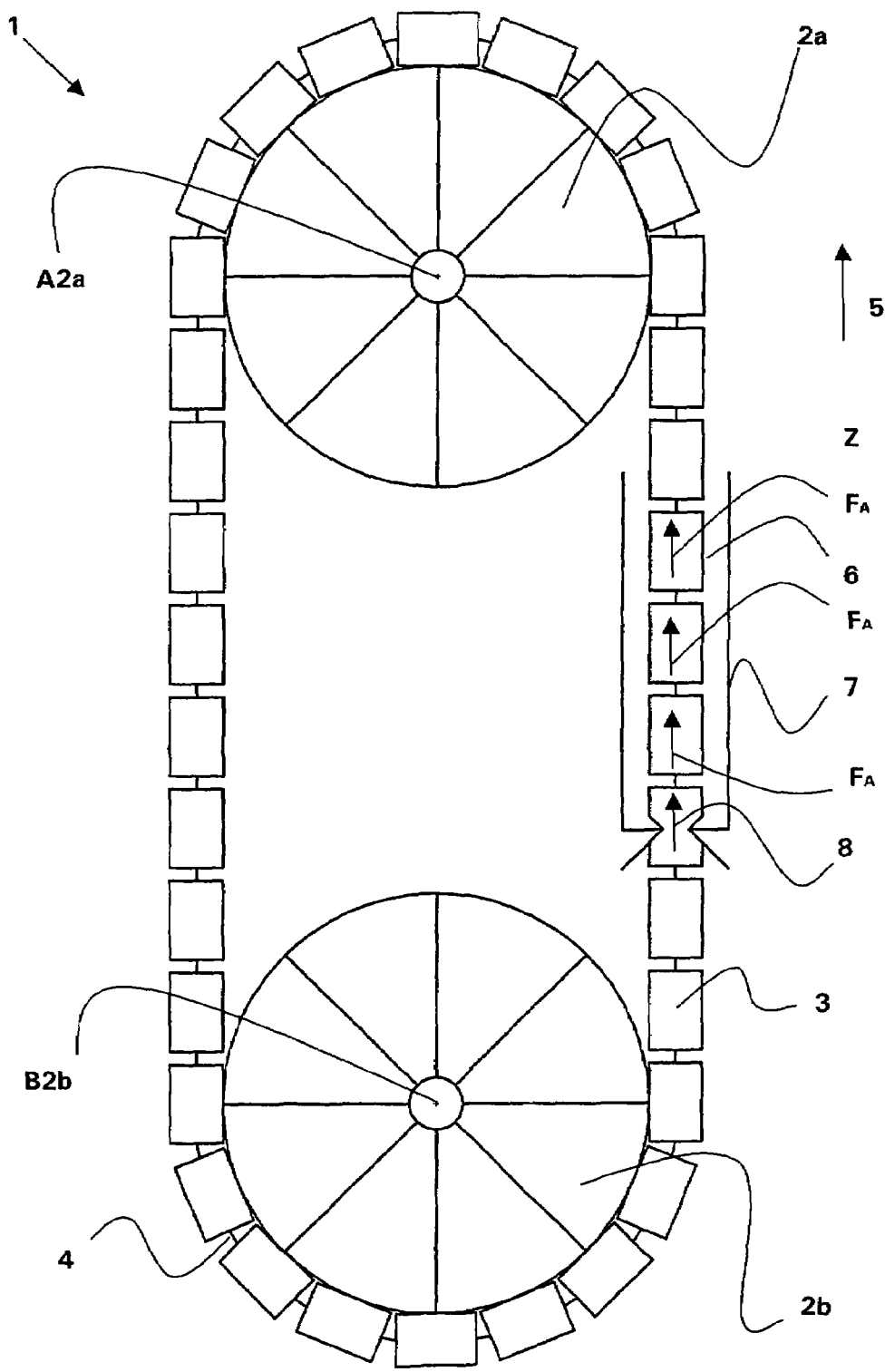
FIG. 1 is a highly simplified schematic illustration of an apparatus according to the invention.

The present invention will now described in more detail with reference to the accompanying drawing:

FIG. 1 shows the apparatus 1 according to the invention comprising two deflection elements 2a, 2b, which are preferably in the form of wheels, rollers or sliding surfaces. Their axes $A_{2a}$, $B_{2b}$ are aligned parallel to one another and are arranged vertically aligned one above the other. In the illustrated exemplary embodiment, a plurality of buoyant bodies 3 which are connected to one another by means of a coupling element 4—for example a wire, a cable or a plastic strip—to form an endless chain are stressed between the deflection elements 2a, 2b in such a way that the buoyant bodies 3 describe a revolving path around the rotating deflection elements 2a, 2b. On the tension side Z of the apparatus 1, which acts against the force of gravity, a container 7 which is filled with a liquid 6 is arranged in such a manner that the buoyant bodies 3 are guided through the liquid-filled container 7 in the rotation direction 5. By way of example, a tube, a tank or else a flexible fabric sack or a similar fluid-tight container 7 may be used as the liquid-filled container 7. According to the invention, the buoyant bodies 3 enter through an inlet opening 8 on the lower face of the liquid-filled container 7. In order to prevent liquid from emerging from the container 7, the inlet opening 8 is closed by a sealing element (not illustrated), which is flexible and flexes as a buoyant body 3 enters it.

Figure 2:
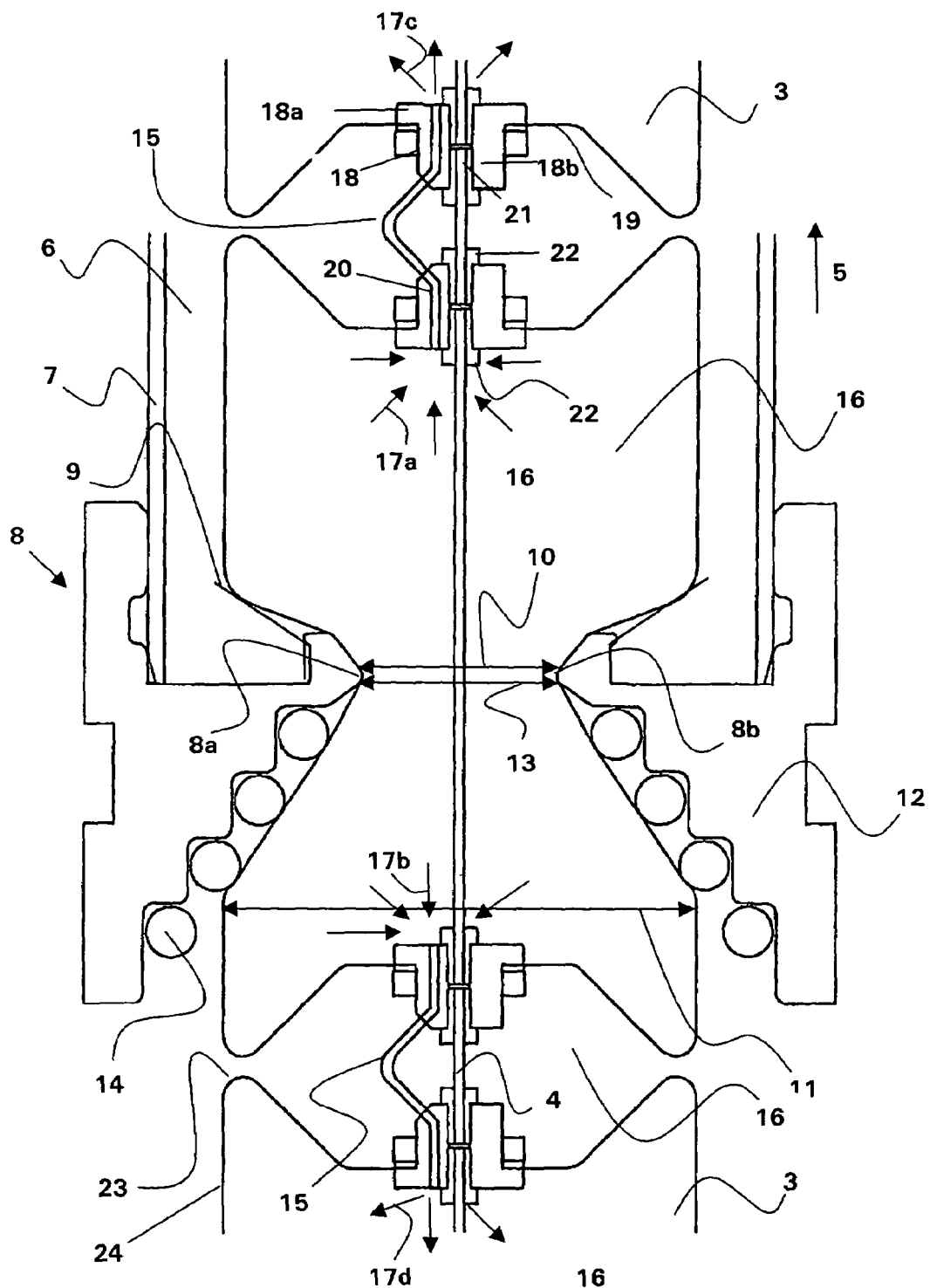
FIG. 2 is a detailed view of an inlet opening in one preferred embodiment of the liquid-filled container.

FIG. 2 shows the inlet opening 8 into the liquid-filled container 7 when approximately half of the longitudinal extent of a buoyant body 3 has entered the liquid-filled container 7. A funnel element 12 is also shown which reduces the size of the elastic buoyant bodies 3 as they pass the funnel element 12 to a cross section 13 which corresponds to the cross section 10 of the inlet opening 8. This cross section 10 of the inlet opening 8 is, according to the invention, smaller than the cross section 11 of the elastic buoyant bodies 3 in the unloaded initial state. In the illustrated exemplary embodiment, the funnel element 12 has sliding elements 14 transversely with respect to the rotation direction 5 of the buoyant bodies 3, which sliding elements 14 reduce the sliding friction between the buoyant bodies 3 and the surface of the funnel element 12 and, in the illustrated exemplary embodiment, are in the form of rollers which are mounted separately from one another, transversely with respect to the tension direction.

Sealing lips 9 are provided in the area of the narrowest point of the funnel element 12, which corresponds to the cross section 10 of the inlet opening 8. These sealing lips 9 in the exemplary embodiment illustrated here are arranged within the liquid-filled container 7 and prevent fluid 6 which is contained within the container 7 from being able to flow out of the container 7 in the area of the inlet opening 8. As an alternative to this, it is also possible to provide for sealing lips to be arranged additionally or exclusively only in the area of the inlet opening 8, in particular in the area of the cross section 10.

The fluids in the elastic buoyant bodies 3 are coupled to one another through a connection element 15. On entry of a buoyant body 3, some of the fluid 16 which is contained in it flows out through the constriction (which is formed at the same height as the inlet opening 8) in the surface of the buoyant body 3 in the directions 17a, 17b, and flows into the adjacent buoyant bodies 3 in the direction 17c, 17d via the fluid connection elements 15.

The individual buoyant bodies 3 are provided with connecting elements 18. The respective connecting elements 18 are arranged on the end faces 19 of the individual buoyant bodies, to be precise in such a way that the connecting elements comprise two parts 18a and 18b, with the first part 18a being arranged within the buoyant body 3, and the further part 18b preferably being screwed on the outside to the first part 18a. Furthermore, holes 20 are provided in the respective connecting elements 18, and are connected to the already described connection element 15. This results in a fluid connection between the individual buoyant bodies.

Furthermore, the connecting elements have centered holes 21 through which a coupling element 4 can be passed. In the exemplary embodiment described here, the coupling element 4 is an endless cable or an endless chain by means of which tensile forces can be transmitted. Plug elements 22 are provided in order to prevent the coupling element 4 from sliding along within the buoyant bodies. These plug elements 22 can be pushed onto the coupling element 4 and can preferably be fixed to the coupling element 4 in the installed state, and being pinched in it. This allows the force of the resultant tensile force to be transmitted from the coupling elements 4 to the connecting elements 18.

The free ends 23 of each of the buoyant bodies 3 are designed in such a manner that the distance from one buoyant body 3 to the next buoyant body 3 is very short. The configurations of the respective connecting elements 18 result in a free space 24 between the buoyant bodies 3, and this is used for the connection element 15 as well as for the connecting elements 18 themselves. The specific configuration of the free ends 23 in the case of the exemplary embodiment described here results in a virtually uniform outer surface 25 of the respective buoyant bodies 3.

It is also advantageous for the distance between two coupled buoyant bodies 3 to be less than the material thickness of the borders 8a, 8b of the inlet opening 8.

Method of Operation:

The buoyant bodies 3 which are located in the liquid-filled container 7 experience a buoyancy force $F_A$ (illustrated in FIG. 1) which corresponds to the force produced by the weight of the displaced liquid volume ($F_A=-\rho*V*g$). This results in a tensile force which initially moves the buoyant bodies 3, which are connected to the coupling element 4, against the direction of the force of gravity. As soon as the buoyant bodies 3 which are connected to one another pass the upper deflection element 2a, the movement direction is deflected with respect to the force of gravity. The force of the weight of the buoyant bodies 3 and of the coupling element 4 at this point increases the energy of motion and thus the speed of revolution and the torque of the apparatus. Once the connected buoyant bodies 3 have passed the lower deflection element 2b, the buoyancy force $F_A$, which is still acting on the buoyant bodies 3 that are located in the liquid-filled container 7, has the effect that the buoyant bodies 3 once again rise in the opposite direction to the force of gravity. Each rising buoyant body 3 successively reaches the lower end face of the liquid-filled container 7 with the inlet opening 8, where the cross section 10 (illustrated in FIG. 2) of the buoyant body 3 is narrowed by elastic deformation to the cross section 11 of the inlet opening 8, as a result of the tensile force which is still acting on it. As soon as the cross section 10 of the buoyant body 3 has been reduced to the cross section 11 of the inlet opening 8, the buoyant body 3 is successively pulled into the liquid-filled container 7. Immediately after entering the liquid-filled container 7, the deformed elastic buoyant body 3 starts to return to its original shape in the unloaded state. This process, which takes place successively, results in a constriction being formed in the buoyant body 3, which is moving in the liquid-filled container 7, at the level of the inlet opening 8, which constriction moves continuously downwards on the buoyant body 3 by virtue of the rising motion of the buoyant body 3, until the buoyant body 3 has completely entered the liquid-filled container 7. This process is repeated for every other buoyant body 3 entering the liquid-filled container 7.

What is claimed is:

1. An apparatus for energy production in the form of a torque, comprising:
    at least two deflection elements, which are arranged aligned with one another, an endless, chain-like coupling element on which at least two buoyant bodies are arranged, and
    a vertically aligned, liquid-filled container with an inlet opening, which is formed on its end face facing the ground, as well as a sealing element which prevents the liquid from emerging, with the buoyant bodies describing a revolving movement about the deflection elements and the buoyant bodies, which move against the force of gravity, passing the liquid-filled container through the inlet opening
wherein
    said buoyant bodies are elastic;
    the cross section of the inlet opening of said liquid-filled container is smaller than the cross section of an elastic buoyant body in the unloaded state;
    said buoyant bodies form a fluid-filled hollow body; and
    the apparatus has at least two elastic buoyant bodies, whose fluids are connected to one another.

2. The apparatus of in claim 1, wherein a funnel element can be fitted in front of the inlet opening and reduces the cross section of the elastic buoyant body to the cross section of the inlet opening.

3. The apparatus of claim 2, wherein said funnel element is provided with sliding elements.

4. The apparatus of claim 1, wherein the distance between two coupled buoyant bodies is less than the material thickness of the borders of the inlet opening.

5. The apparatus of claim 1, wherein said liquid-filled container is protected against leakage by means of a catchment element.

6. The apparatus of claim 1, wherein an apparatus for stressing the coupling element can be fitted.

7. The apparatus of claim 1, wherein at least two apparatuses are coupled to one another.

* * * * *